Oct. 4, 1927.　　　　F. COSGRO　　　　1,644,415
LIQUID GAUGE
Filed March 2, 1926　　　2 Sheets-Sheet 2
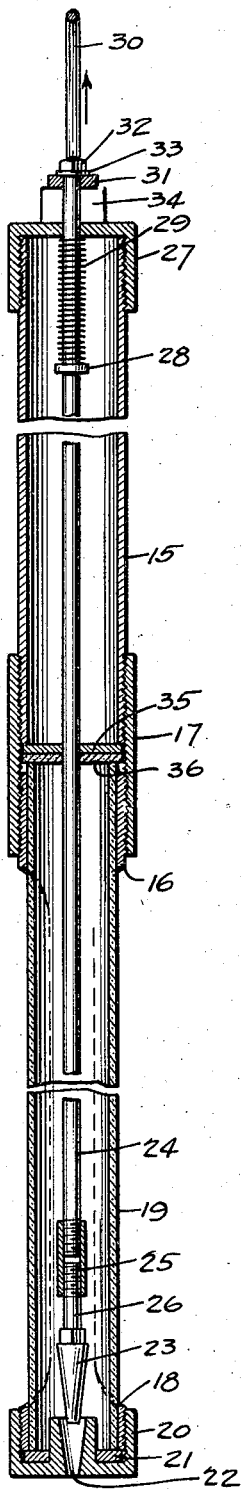
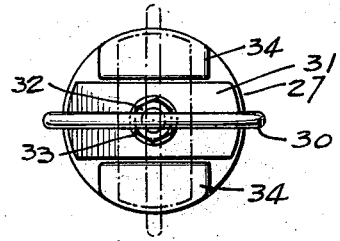
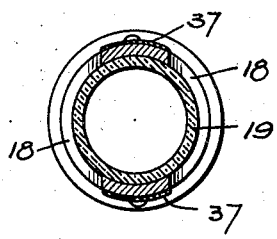
Inventor
FRED COSGRO
By Munn & Co.
Attorney Patented Oct. 4, 1927.

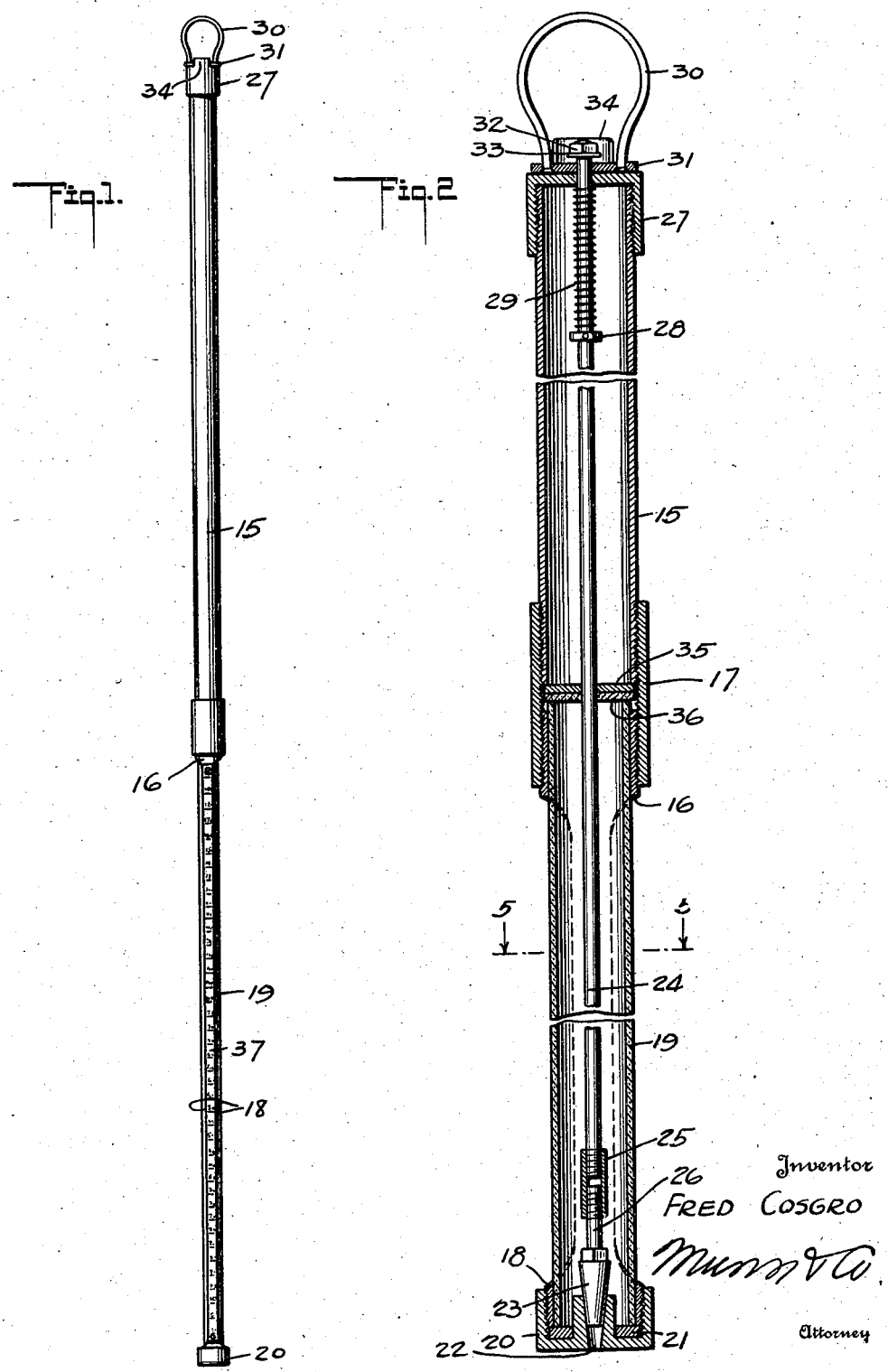

1,644,415

UNITED STATES PATENT OFFICE.

FRED COSGRO, OF HUNTINGTON BEACH, CALIFORNIA.

LIQUID GAUGE.

Application filed March 2, 1926. Serial No. 91,800.

My invention relates generally to instruments for measuring liquids, and specifically to gauges for accurately determining the amount of gasoline or other liquid in a tank or other vessel.

It is a purpose of my invention to provide a gasoline gauge by means of which the amount of gasoline or other liquid in a tank or other vessel can be accurately determined and, further, a gauge presenting structural characteristics which permit the production of a gauge of minimum cost; a gauge capable of successfully withstanding rough usage; and a gauge consisting of a minimum number of parts, easily and quickly assembled and disassembled in a manner to permit the ready substitution of new parts should the old become worn or broken.

I will describe only one form of liquid gauge embodying my invention and will then point out the novel features thereof in claims.

In the accompanying drawings,

Figure 1 is a view showing in side elevation one form of liquid gauge embodying my invention;

Figure 2 is a central vertical sectional view of the gauge shown in Figure 1 and with the valve thereof in closed position;

Figure 3 is a view similar to Figure 2 but taken at right angles to the latter, showing the valve of the gauge in open position;

Figure 4 is a top plan view of the gauge with the cross head in the position shown in Figure 2;

Figure 5 is a transverse sectional view taken on the line 5—5 of Figure 2.

Similar reference characters refer to similar parts in each of the several views.

Referring specifically to the drawings, my invention, in its present embodiment, comprises a pair of tubular bodies 15 and 16, respectively, formed of metal or other suitable material and arranged one above the other in end to end realtion. At their confronting ends the two bodies are exteriorly threaded to be engaged by a connecting sleeve 17 which permits of the quick connecting of the two bodies and the rigid maintenance of the same in end to end relation.

The lower body 16 is formed at diametrically opposed points with elongated opening indicated at 18 which constitute windows through which a tube 19 formed of glass or other suitable material may be observed. This tube 19 is of such external diameter as to snugly fit within the body 16, the lower end of the body being exteriorly threaded to recevie a cup-shaped cap 20, and a rubber gasket 21 being interposed between the cap and the lower end of the tube 19 to form a seat for such tube to protect the latter against breakage. The cap 20 is provided with a conical port 22 through which gasoline or other liquids may enter or leave the tube 19, and this port is controlled by a conical valve 23 movable vertically within the tube to occupy a closed position, as shown in Figure 2, or an open position, as shown in Figure 3.

The valve 23 is capable of being moved to either open or closed position with respect to the port 22 through the medium of a rod 24 within the tube 19 which is operatively connected to the valve by a turn buckle 25 threadedly engaging the rod, and the stem 26 of the valve. This turn buckle 25 also functions to allow of a longitudinal adjustment of the valve on the rod so as to insure the proper seating or unseating of the valve when the rod 24 is manually actuated.

As clearly shown in Figure 2, the rod 24 extends upwardly through the upper body 15 and through a cap 27 threaded on and closing the upper end of the body 15. Beneath the cap 27 the rod is provided with a collar 28 and interposed between the cap and collar is an expansible spring 29 which functions to urge the rod downwardly so as to normally maintain the valve 23 in closed position with respect to the port 22. The rod 24 is adapted to be lifted manually against the action of the spring 29 by a looped handle 30 connected at its ends to a cross head 31 which loosely receives the rod 24 but is confined against displacement therefrom by a nut 32 and a washer 33. The mounting of the cross head 31 on the rod 24 is such as to allow rotational movement thereof to occupy the position shown in solid lines in Figure 1 when the rod 24 is in its lowermost position, or to occupy the position shown in dot and dash lines in Figure 4 when the rod is in its uppermost position. In this latter position, the cross head engages a pair of projections 34 formed on the cap 27 so as to maintain the rod in elevated position against the action of the spring 29 and to thereby hold the valve 23 in open position.

To guide the rod in its vertical movement and to protect the upper end of the glass tube 19 against possible breakage, I interpose between the upper end of the tube 19 and the lower end of the body 15 a metallic gasket 35 and a leather or other suitable form of soft gasket 36. As clearly shown in Figure 3, the gasket 36 is in engagement with the upper end of the tube 19, and both of the gaskets are formed with openings through which the rod 24 is free to move vertically.

In practice, the lower end of the gauge is submerged to the extreme bottom of the liquid to be measured, and with the valve 23 in open position, the liquid is free to flow into the tube 19 to a level corresponding to the level of the liquid in the tank or other container. By now rotating the cross head 31 to disengage the projections 34, the spring 29 may function to return the valve 23 to closed position, thus trapping the liquid within the tube. By now removing the instrument from the liquid and observing the level of the liquid in the tube, the amount of liquid contained in the tank can be determined. To accurately determine the amount of liquid in the tube I have provided a strip 37 of metal or other suitable material detachably secured in any suitable manner to the body 16, and this strip is graduated so that the exact amount of liquid contained in the tube can be determined.

Although I have herein shown and described only one form of liquid gauge embodying my invention, it is to be understood that various changes and modifications may be made therein without departing from the spirit of the invention and the spirit and scope of the appended claims.

I claim as my invention:

1. A liquid gauge comprising a pair of tubular bodies in end to end relation with the lower body formed with openings, a sleeve detachably connecting the bodies, a cap closing the upper end of the upper body, a transparent tube in the lower body, a cap on the lower end of the lower body having a port therein through which liquid may enter or leave the transparent tube, a valve in the tube movable to open or close said port, a rod adjustably and detachably connected to the valve and extending upwardly through the two bodies and through the first cap, a nut on the upper end of the rod, a projection on the rod spaced from said upper end, a spring interposed between the projection and nut to normally urge the rod downwardly and cause said valve to close said port, projections on the upper cap, a cross head rotatable on the upper end of the rod to engage the projections of said cap to maintain the rod in elevated position against the action of said spring and to thereby maintain the valve in open position, and an operating handle carried by the cross head.

2. A liquid gauge as embodied in claim 1 wherein compressible gaskets are arranged at the opposite ends of the transparent tube and between said tube and said bodies, the gaskets between the tube and bodies being of disk form and provided with openings through which the rod extends so as to seal the upper body against the admission of liquid.

3. A liquid gauge comprising a pair of tubular bodies detachably connected in end to end relation, a transparent tube in one of the bodies, the last mentioned body being provided with openings to expose portions of said tube, a ported cap for the last mentioned body through which liquid is free to enter or leave said tube, a valve controlling said port, and a rod for operating the valve, said rod being movable in the bodies and tube and normally urged to a position in which the valve closes said port.

4. A liquid gauge as embodied in claim 3 wherein means is associated with the rod for releasably securing the rod in a position against the action of its urging means in which the valve is in open position.

5. A liquid gauge comprising a tubular body having a transparent portion, a port in the lower end of the body through which liquid is free to enter or leave the transparent portion, a valve controlling said port, projections on the body, a rod movable in the body to actuate said valve, resilient means normally urging the rod to a position in which said valve is closed, a cross head on the rod rotatable to engage said projections to maintain the rod in a position against the action of said resilient means to retain the valve in open position.

FRED COSGRO.